(12) United States Patent
Reuter

(10) Patent No.: US 6,409,416 B1
(45) Date of Patent: *Jun. 25, 2002

(54) RACK FOR A SWITCH CABINET

(75) Inventor: Wolfgang Reuter, Burbach (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/462,984
(22) PCT Filed: Jul. 11, 1998
(86) PCT No.: PCT/EP98/04302
§ 371 (c)(1), (2), (4) Date: Jan. 14, 2000
(87) PCT Pub. No.: WO99/04470
PCT Pub. Date: Jan. 28, 1999

(30) Foreign Application Priority Data

Jul. 16, 1997 (DE) .......................... 197 30 430

(51) Int. Cl.⁷ .............. A47F 7/00; H02B 1/01; B25G 3/36
(52) U.S. Cl. .......... 403/402; 403/403; 211/26; 211/189; 312/265.1; 361/825
(58) Field of Search ............ 312/265.1, 265.2, 312/265.3, 265.4; 403/402, 403; 211/26; 361/825

(56) References Cited

U.S. PATENT DOCUMENTS

| | | | | |
|---|---|---|---|---|
| 2,897,927 A | * | 8/1959 | Fitzgerald | 403/295 X |
| 4,676,686 A | * | 6/1987 | Eisenloffel | 403/402 |
| 4,725,083 A | * | 2/1988 | Schauer | 403/295 X |
| 4,833,803 A | * | 5/1989 | Schwartz | 403/295 X |
| 5,275,296 A | * | 1/1994 | Zachrai | 211/26 |
| 5,695,263 A | * | 12/1997 | Simon et al. | 312/265.4 |
| 5,799,430 A | * | 9/1998 | Fremstad | 403/402 X |
| 5,820,289 A | * | 10/1998 | Kern et al. | 403/231 |
| 5,927,039 A | * | 7/1999 | De Boer | 403/402 X |
| 6,030,063 A | * | 2/2000 | Benner | 312/265.1 |
| 6,164,460 A | * | 12/2000 | Reuter | 312/265.1 X |

FOREIGN PATENT DOCUMENTS

| | | | |
|---|---|---|---|
| BE | 620483 A | * | 11/1962 |
| DE | 4207308 A1 | * | 9/1993 |
| GB | 695180 | * | 8/1953 |

* cited by examiner

Primary Examiner—Lynne H. Browne
Assistant Examiner—Ernesto Garcia
(74) Attorney, Agent, or Firm—Pauley Peterson Kinne & Erickson

(57) ABSTRACT

A rack for a switch cabinet, having frame pieces which in the floor area of the switch cabinet form a base frame surrounding an opening which can be closed by base panels. The base frame can be or is connected to a base. By simple, lengthened U-profile frame sections and corner elements configured as bent, cut pieces, a simple, economical base frame for the rack is created which requires little space and can be used for fastening the base panels directly without the need for additional structured supporting shapes.

10 Claims, 2 Drawing Sheets

RACK FOR A SWITCH CABINET

BACKGROUND OF THE INVENTION

1. Field of the Invention

This invention relates to a rack for a switchgear cabinet assembled from frame legs, which form a bottom frame in a bottom area of the switchgear cabinet, which encloses an opening that can be closed by bottom panels, and which can be or is connected with a base.

2. Description of Related Art

As a rule, the rack for a switchgear cabinet consists of twelve identical frame legs, as shown in German Patent Reference DE 33 44 598 C1. Here, increasing demands are made on the frame legs with respect to expanding options in the interior and the sealing of the wall elements and the cabinet door, which require an expensive rack. With these known racks the bottom frame is also constructed of four expensive frame legs, although as a rule it is only required in this area that bottom panels with cable connectors close the lower opening of the switchgear cabinet. In this case, often additional support profiles are connected with the bottom frame, on which the bottom panels rest and are fixed in place. This elaborate bottom frame requires a greater amount of space, which to a large extent is lost as installation space in the switchgear cabinet. Moreover, the known bottom frame with the support profiles makes the rack, and therefore the switchgear cabinet, more expensive.

SUMMARY OF THE INVENTION

It is one object of this invention to provide a rack of the type mentioned above but with a bottom frame that can be produced more cost-effectively, and which occupies less installation space in the switchgear cabinet and can be simply used for fastening the bottom panels.

In accordance with this invention this object is achieved with a bottom frame assembled from four cut to size U-profile sections and four square corner elements. The U-profile sections are open at the top, have an outer edge which is bent upward at right angles, and have an L-shaped inner edge oriented toward the outer edge. The corner elements cover the adjoining U-profile sections with fastening flanges and are connected with them, and the corner elements rest with an inside located angle bracket against the insides of the inner edges of the abutting U-profile sections and complete the outer edge of the bottom frame with an outside angle piece in the corner areas.

The U-profile sections are very simple and have only a low structural height. The corner elements are simple stamped and bent elements and complete the bottom frame by forming a closed unit. The L-shaped inner edge provides a simple support and fastening possibility for the bottom panels.

In accordance with one embodiment, the connection between the U-profile sections and the corner elements is provided so that the fastening flanges of the corner elements are offset in an upward direction and cover the abutting U-profile sections in the area of their base legs and are welded together with them.

In another embodiment, the corner elements are equipped with fastening receivers in their square base plates, and thus the bottom frame can be screwed together with the base of the switchgear cabinet, in a simple manner.

In accordance with one embodiment, there is a connection between the bottom frame and the vertical frame legs of the rack because the corner elements have upward oriented connecting flanges for attaching the vertical frame legs of the rack.

A simple fastening possibility for the bottom panels is created because the end sections of the L-shaped inner edges form support edges for support sections of bottom panels. The bottom panels are fixed in place on the L-shaped inner edges of the U-profile sections with U-shaped clamps having attachment screws.

The bottom opening of the rack can be divided because on facing sides the inner edge of the bottom frame has receivers oriented toward each other for a bisecting rail section, on which partial bottom panels are supported and fixed in place.

BRIEF DESCRIPTION OF THE DRAWINGS

This invention will be explained in greater detail by means of two exemplary embodiments, represented in perspective views in the drawings wherein.

DESCRIPTION OF PREFERRED EMBODIMENTS

Figure 1:
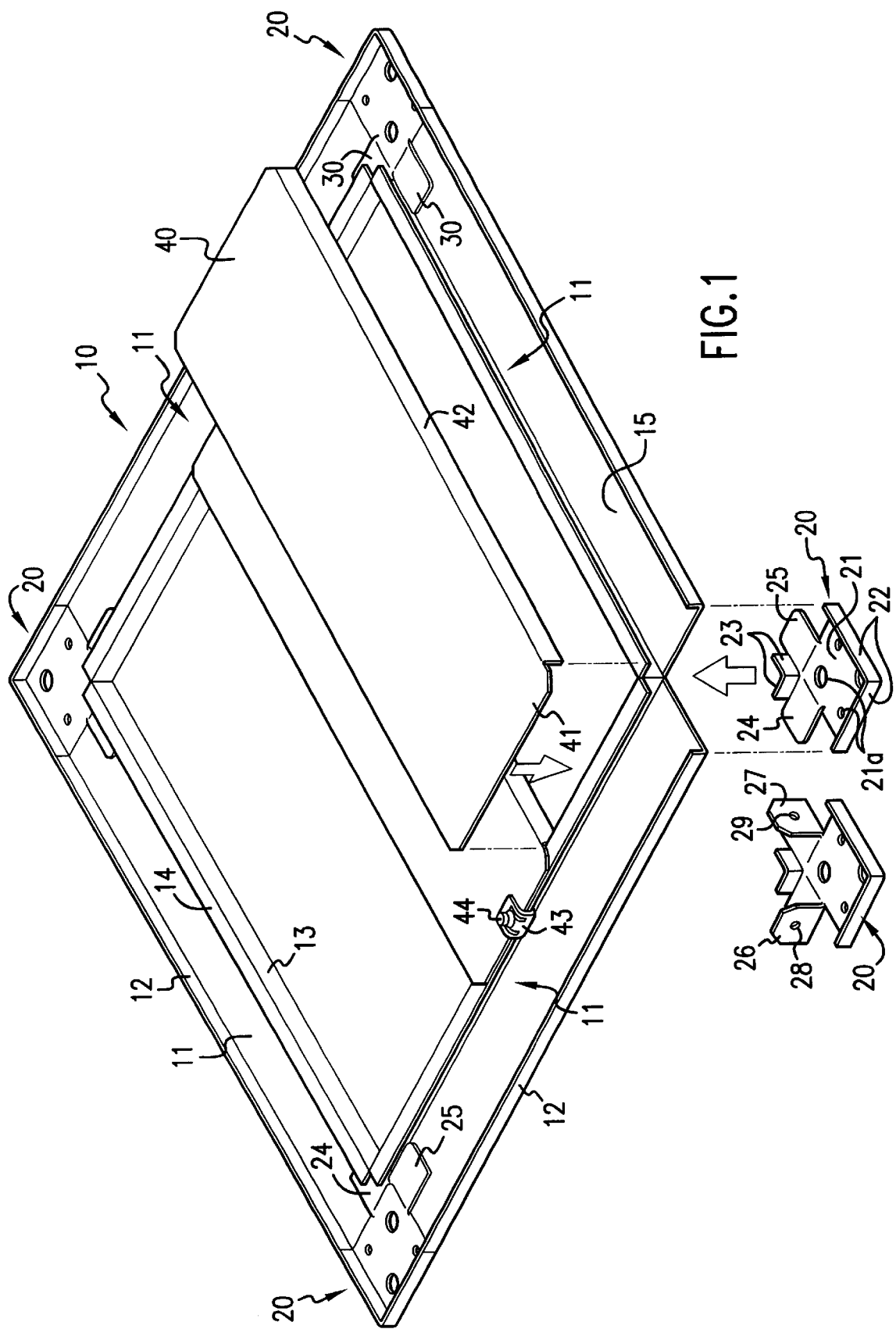
FIG. 1 is of a square bottom frame, which can be closed off by means of bottom panels.

As FIG. 1 shows, a square bottom frame 10 in accordance with this invention, is assembled from four U-profile sections 11 of equal length and four square corner elements 20. In FIG. 1, the U-profile sections 11 have an upward directed outer edge 12 and an L-shaped inner edge 13, 14, wherein the end section 14 of the inner edge 13, 14 is oriented toward the outer edge 12 and forms a support for support edges 41 of bottom panels 40.

The corner elements 20 have a square base plate 21 with fastening receivers 21a. Upward oriented angle brackets 22 and 23 are bent from the base plate 21, wherein the angle bracket 23 on the inside rests against the insides of the starting sections 13 of the abutting U-profile sections 11, while the angle bracket 22 on the outside completes the outer edge 12 in the assigned corner area. Fastening flanges 24 and 25 are attached to the base plate 21, which are upwardly offset with respect to the base plate by the thickness of the base leg of the U-profile section 11, so as to extend over and possibly connect with them. In this case the fastening flanges 24 and 25 are preferably welded on the U-profile sections 11, for example spot-welded.

If the bottom panels 40 are reinforced on the sides extending vertically in relation to the support edges 41 by means of angled edges 42, the edges 42 are notched out in the area of the support edges 41. The bottom frame 10 is open toward the top and can be screwed together with a base via the fastening receivers 21a of the corner elements 20.

As shown in FIG. 1, it is also possible to attach upward oriented connecting flanges 26 and 27 with fastening bores 28 and 29 to the corner elements 20, on which the vertical frame legs of the rack can be fixed by screws. In that case the rack forms a unit together with the bottom frame 10.

The bottom panels 40 rest with the support edges 41 on the end sections 14 of the inner edge of the bottom frame 10. U-shaped clamps 43 receive the end section 14 and the support edge 41, and both are clamped on the clamp 43 by means of an attachment screw 44.

Figure 2:
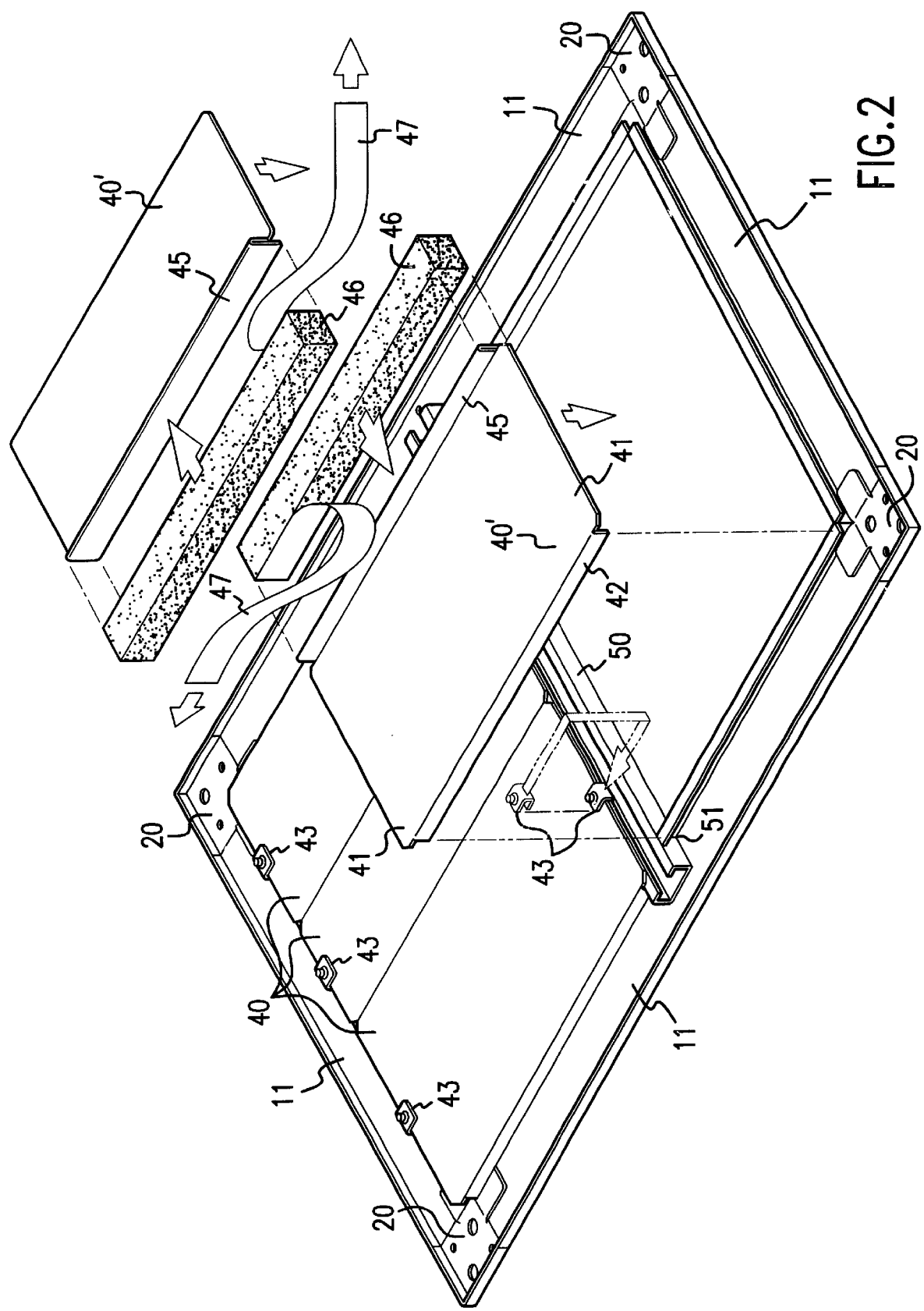
FIG. 2 is of a rectangular bottom frame which, with a bisecting rail, is divided into two areas, which can be closed by bottom panels, wherein there is a cable inlet in one area.

As shown by means of the exemplary embodiment in FIG. 2, the bottom frame 10 can also be designed to be rectangular, wherein a division is made in the longitudinal direction. Thus, receivers 51 are notched out on facing sides of the inner edge 11, 12, into which a bisecting rail section 50 is placed flush, which also forms support edges for partial bottom plates 40'. The partial bottom plates 40' rest with support edges 42 on the end section 14 of the inner edge and on the bisecting rail section 50, and are fixed in place on them by means of U-shaped clamps 43.

Sealing edges 45 of the partial bottom plates 40' can be oriented toward each other, which support sealing strips 46 that are embodied as blocks of plastic foam material and designed as a cable conduit. Protected strips 47 are torn off the sealing strips 46, so that they can be connected by means of the exposed adhesive layer with the sealing edges 45 of the partial bottom plates 40'.

The division of the bottom frame 10 can also be further increased by means of several bisecting rail sections 50. It is thus possible to create several cable conduits in the bottom area.

The outer edge and the inner edge of the bottom frame 10 are upwardly oriented and have a low structural height, so that the bottom frame 10 only occupies a small, negligible portion of a predetermined cabinet height. In addition, the bottom frame 10 offers direct fastening and division possibilities for bottom plates. The bottom frame 10 is simply constructed and can be cost-effectively produced since, besides the cut to size U-profile sections 11, only simple stamped and bent elements are required as corner elements 20.

What is claimed is:

1. In a rack for a switchgear cabinet, the rack including a bottom frame in a bottom area of the rack and enclosing an opening closeable by bottom panels, an improvement comprising:

the bottom frame (10) assembled from four adjoining U-profile sections (11) and four square corner elements (20), wherein the U-profile sections (11) open upwardly, have an outer edge (12) bent upward at a right angle and an L-shaped inner edge (13, 14) oriented toward the outer edge (12), the corner elements (20) covering the adjoining U-profile sections (11) with fastening flanges (24, 25) and connecting the adjoining U-profile sections (11), and the corner elements (20) each having an inside angle bracket (23) aligned against insides of the inner edge (13, 14) of the adjoining U-profile sections (11) and an outside angle piece (22) in corner areas completing the outer edge (12) of the adjoining U-profile sections.

2. In the rack in accordance with claim 1, wherein the fastening flanges (24, 25) of the corner elements (20) are offset in an upward direction and welded to the adjoining U-profile sections (11) in an area of base legs 15. 15 in.

3. In the rack in accordance with claim 2, wherein the corner elements (20) have fastening receivers (21*a*) in square base plates (21).

4. In the rack in accordance with claim 3, wherein the corner elements (20) have upward oriented connecting flanges (26, 27) for attaching the vertical frame legs of the rack.

5. In the rack in accordance with claim 4, wherein end sections (14) of the L-shaped inner edges (13, 14) form support edges for support sections (41) of the bottom panels (40), and the bottom panels (40) are fixed on the L-shaped inner edges (13, 14) of the U-profile sections (11) by U-shaped clamps (43) having attachment screws (44).

6. In the rack in accordance with claim 5, wherein on at least two opposing sides of the inner edge (13, 14) of the bottom frame (10) are receivers (51) oriented toward each other for a bisecting rail section (50) on which partial bottom panels (40') are supported and fixed.

7. In the rack in accordance with claim 1, wherein the corner elements (20) have fastening receivers (21*a*) in square base plates (21).

8. In the rack in accordance with claim 1, wherein the corner elements (20) have upward oriented connecting flanges (26, 27) for attaching the vertical frame legs of the rack.

9. In the rack in accordance with claim 1, wherein end sections (14) of the L-shaped inner edges (13, 14) form support edges for support sections (41) of the bottom panels (40), and the bottom panels (40) are fixed on the L-shaped inner edges (13, 14) of the U-profile sections (11) by U-shaped clamps (43) having attachment screws (44).

10. In a rack for a switchgear cabinet, the rack including a bottom frame in a bottom area of the rack and enclosing an opening closeable by bottom panels, an improvement comprising:

the bottom frame (10) assembled from four adjoining U-profile sections (11) and four square corner elements (20), wherein the U-profile sections (11) open upwardly, have an outer edge (12) bent upward at a right angle and an L-shaped inner edge (13, 14) oriented toward the outer edge (12), the corner elements (20) covering the adjoining U-profile sections (11) with fastening flanges (24, 25) and connecting the adjoining U-profile sections (11), the corner elements (20) each having an inside angle bracket (23) aligned against insides of the inner edge (13, 14) of the adjoining U-profile sections (11), and an outside angle piece (22) in corner areas completing the outer edge (12) of the adjoining U-profile sections, and receivers (51) oriented toward each other on at least two opposing sides of the inner edge (13, 14) of the bottom frame (10) for a bisecting rail section (50) on which partial bottom panels (40') are supported and fixed.

\* \* \* \* \*